United States Patent
Hofkirchner et al.

(10) Patent No.: US 10,107,396 B2
(45) Date of Patent: Oct. 23, 2018

(54) LOCKING ARRANGEMENT

(71) Applicant: Magna Powertrain GmbH & Co KG, Lannach (AT)

(72) Inventors: Rainer Hofkirchner, St. Valentin (AT); Stefan Merz, Vienna (AT); Christian Reisinger, Ottensheim (AT); Michael Schaffenberger, Hofstätten an der Raab (AT); Bernhard Steiner, Viehodorf (AT); Andreas Schmidhofer, Bruck an der Mur (AT); Christoph Öberseder, Prambachkirchen (AT)

(73) Assignee: MAGNA POWERTRAIN GMBH & CO KG, Lannach (AT)

( * ) Notice: Subject to any disclaimer, the term of this patent is extended or adjusted under 35 U.S.C. 154(b) by 0 days.

(21) Appl. No.: 15/425,268

(22) Filed: Feb. 6, 2017

(65) Prior Publication Data
US 2017/0234427 A1 Aug. 17, 2017

(30) Foreign Application Priority Data

Feb. 15, 2016 (DE) .......... 10 2016 202 282
Aug. 8, 2016 (DE) .......... 10 2016 214 682

(51) Int. Cl.
*F16H 63/34* (2006.01)

(52) U.S. Cl.
CPC ..... *F16H 63/3425* (2013.01); *F16H 63/3466* (2013.01); *F16H 63/3491* (2013.01)

(58) Field of Classification Search
None
See application file for complete search history.

(56) References Cited

U.S. PATENT DOCUMENTS 3,987,879 A * 10/1976 Longshore .......... B60T 1/005
192/219.5
2002/0092710 A1* 7/2002 Oppitz ............... B60T 1/005
188/69

(Continued)

FOREIGN PATENT DOCUMENTS

CN 104358866 A 2/2015
DE 10037565 A1 * 4/2002 .......... B60T 1/005

(Continued)

OTHER PUBLICATIONS

Search Report dated May 13, 2018 in corresponding Chinese Patent Application No. 2017100783787.

*Primary Examiner* — Jacob S. Scott
*Assistant Examiner* — Timothy Hannon
(74) *Attorney, Agent, or Firm* — Dickinson Wright PLLC

(57) ABSTRACT

A locking arrangement for a transmission of a motor vehicle, comprising a locking toothing; a locking pawl, wherein the locking pawl is pivotable about a first rotary axis; a control element, wherein the locking pawl can be brought optionally into engagement with the locking toothing via the control element; a drive unit, wherein the control element can be brought by means of the drive unit into a release position and a locking position; a holding mechanism, wherein the control element can be held by means of the holding mechanism in the release position and in the locking position; and a safety mechanism comprising an electromagnet, an actuator and a first elastic element, wherein the actuator is pretensioned in a first actuator position by the first elastic element and can be held in a second actuator position by the electromagnet.

13 Claims, 5 Drawing Sheets

(56) References Cited

U.S. PATENT DOCUMENTS

| | | | | |
|---|---|---|---|---|
| 2003/0188595 A1* | 10/2003 | Kropp | F16H 63/304 | 74/473.12 |
| 2004/0011609 A1* | 1/2004 | Schmid | B60T 1/005 | 188/265 |
| 2004/0237694 A1* | 12/2004 | Lindenschmidt | F16H 63/3416 | 74/473.21 |
| 2007/0283735 A1* | 12/2007 | Schweiher | F16H 63/3433 | 70/245 |
| 2014/0110216 A1* | 4/2014 | Pollack | F16H 63/3433 | 192/219.4 |
| 2014/0116180 A1* | 5/2014 | Keller | F16D 11/10 | 74/473.36 |
| 2015/0025750 A1* | 1/2015 | Weslati | B60W 10/11 | 701/48 |
| 2015/0152944 A1* | 6/2015 | Buender | F16H 63/304 | 74/337.5 |
| 2015/0159752 A1* | 6/2015 | Popp | F16H 63/34 | 192/219.4 |
| 2016/0082933 A1* | 3/2016 | Iwata | B60T 1/005 | 188/163 |

FOREIGN PATENT DOCUMENTS

| | | |
|---|---|---|
| DE | 102004021981 A1 | 11/2004 |
| DE | 102011105380 A1 | 12/2011 |
| DE | 102010053505 A1 | 6/2012 |
| DE | 102013213707 A1 | 1/2015 |
| JP | 2006322489 A | 11/2006 |

\* cited by examiner

LOCKING ARRANGEMENT

CROSS-REFERENCE TO RELATED APPLICATIONS

This application claims priority to German Application No. DE 102016202282.2, filed on Feb. 15, 2016 and German Application No. DE 102016214682.3, filed on Aug. 8, 2016. The entire disclosures of each of the above applications are incorporated herein by reference.

FIELD

The present invention concerns a locking arrangement for a transmission of a motor vehicle, in particular for a parking locking arrangement of a motor vehicle.

BACKGROUND

Locking arrangements of said type are commonly used in the field of motor vehicle technology, and are integrated in motor vehicles in widely varying designs.

DE 10 2013 213 707 A1 for example describes a parking lock for a motor vehicle, having a locking pawl pivotable about a rotary axis, with a pawl tooth for engagement in a locking toothing, an actuating unit which can be coupled mechanically to the locking pawl and via which the locking tooth can be brought reversibly into engagement against the locking toothing, wherein the actuating unit can be moved in translation by means of an actuator over a function surface and the function surface is arranged movably in translation on the non-end-side casing surface of the actuating unit and is part of a planetary rolling gear mechanism which has a planetary rolling gear casing connected to a crown gear driven by the actuator.

Document DE 10 2004 021 981 A1 discloses for example a parking lock for an automatic motor vehicle transmission, with at least one spring accumulator for engaging the parking lock, with a release device for opening the parking lock, and with a holding device for holding the parking lock in the open state by countering the spring force of at least one spring accumulator, wherein the release device can be actuated by a transmission actuator.

SUMMARY

It is an object of the invention to specify an alternative locking arrangement of said type which in particular has a compact structure and guarantees reliable operation.

This object is achieved by a locking arrangement for a transmission of a motor vehicle, comprising a locking toothing; a locking pawl, wherein the locking pawl is pivotable about a first rotary axis; a control element, wherein the locking pawl can be brought optionally into engagement with the locking toothing via the control element; a drive unit, wherein the control element can be brought by means of the drive unit into a release position and a locking position; a holding mechanism, wherein the control element can be held by means of the holding mechanism in the release position and in the locking position; and a safety mechanism comprising an electromagnet, an actuator and a first elastic element, wherein the actuator is pretensioned in a first actuator position by the first elastic element and can be held in a second actuator position by the electromagnet.

According to the present invention, the locking arrangement comprises a locking toothing, a locking pawl, a control element, a drive unit, a holding mechanism and a safety mechanism. The locking pawl is pivotable about a first rotary axis and may be brought optionally into engagement with the locking toothing via the control element. The control element according to the invention may be brought by means of the drive unit into a release position and a locking position. In the locking position of the control element, the locking pawl is engaged with the locking toothing, which leads to a blocking for example of a transmission and/or drive train element of a motor vehicle. In the release position of the control element, the locking pawl is out of engagement with the locking toothing, whereby no blocking occurs for example of a transmission and/or drive train element of a motor vehicle. According to the present invention, the control element can be held in the release position and in the locking position by a holding mechanism.

The safety mechanism according to the invention comprises an electromagnet, an actuator and a first elastic element. According to the invention, the actuator of the safety mechanism is pretensioned in a first actuator position by the first elastic element, and can be held in a second actuator position by the electromagnet of the safety mechanism. The control element can be brought into the locking position by the actuator of the safety mechanism in the first actuator position. The control element can be brought into the release position by the actuator of the safety mechanism in the second actuator position.

With the present configuration of the locking arrangement according to the invention, a particularly compact, simple construction is guaranteed with a reduced number of components. Furthermore, the configuration of the locking arrangement according to the invention ensures an extremely reliable operation. The design of the locking arrangement according to the invention in addition allows a modular construction.

Moreover, by the structure of the locking arrangement according to the invention, production costs are reduced.

In particular, because of the configuration of the safety mechanism, widely varying functional requirements of the locking arrangement can still be fulfilled in the event of a fault for example. Thus for example it is possible, by simple adaptation of the safety mechanism, to transfer the control element of the locking arrangement optionally into the locking position or the release position in the event of a fault, such as for example a partial failure of the drive unit.

Refinements of the invention are described in the dependent claims, the description and the enclosed drawings.

Preferably, the drive unit comprises an electric motor and a spindle drive. The spindle drive preferably comprises a threaded spindle and a threaded nut. The threaded spindle can preferably be actuated by the electric motor into a locking rotary movement and a release rotary movement, wherein the threaded nut is axially movable relative to the threaded spindle. The term "axial" describes a direction along or parallel to a longitudinal axis of the threaded spindle of the spindle drive. The term "radial" describes a direction perpendicular to the longitudinal axis of the threaded spindle of the spindle drive. A locking rotary movement of the threaded spindle of the spindle drive corresponds to a rotary movement of the threaded spindle about the longitudinal axis of the threaded spindle in a first rotation direction. A release rotary movement of the threaded spindle of the spindle drive corresponds to a rotary movement of the threaded spindle about the longitudinal axis of the threaded spindle in a second rotation direction, namely a rotation direction opposite the first rotation direction.

Preferably, the control element is hinged on the threaded nut so as to be pivotable about a second rotary axis.

As a result of a locking rotary movement of the threaded spindle, the threaded nut moves relative to the threaded spindle into a first position, and the control element which is pivotably connected to the threaded nut is transferred to the locking position.

As a result of a release rotary movement of the threaded spindle, the threaded nut moves relative to the threaded spindle into a second position, and the control element which is pivotably connected to the threaded nut is transferred to the release position.

In an advantageous embodiment of the locking arrangement according to the present invention, the holding mechanism is configured such that it acts on the spindle drive, particularly preferably on the threaded nut of the spindle drive of the drive unit, and thus holds the control element in the release position and in the locking position.

Preferably, the holding mechanism comprises a holding element which is pretensioned in a radial direction via a second elastic element. Furthermore, the threaded nut of the spindle drive has on its outer casing two holding recesses, namely a first holding recess and a second holding recess, wherein the control element can be held in the release position by engagement of the holding element of the holding mechanism in the first holding recess on the outer casing of the threaded nut of the spindle drive, and wherein the control element can be held in the locking position by engagement of the holding element of the holding mechanism in the second holding recess on the outer casing of the threaded nut of the spindle drive.

Particularly preferably, the actuator of the safety mechanism is arranged axially movably on the threaded spindle, substantially between the electric motor and the threaded nut of the spindle drive.

Furthermore, in an advantageous embodiment of the present invention, the threaded nut may be formed in at least two pieces, comprising a first threaded nut element and a second threaded nut element.

Preferably, the control element, in addition to the drive unit, can be moved manually from the locking position into the release position by means of a mechanical device, for example a Bowden cable.

The control element of the locking arrangement is preferably guided at least partially in a recess of the locking pawl.

By guiding the control element on the locking pawl, the sensitivity to the locking element to vibrations and/or mechanical impacts is minimised in all positions, namely in the locking position of the control element and in the release position of the control element.

DESCRIPTION OF THE DRAWINGS

The drawings described herein are for illustrative purposes only of selected embodiments and not all possible implementations, and are not intended to limit the scope of the present disclosure.

DETAILED DESCRIPTION

Figure 1:
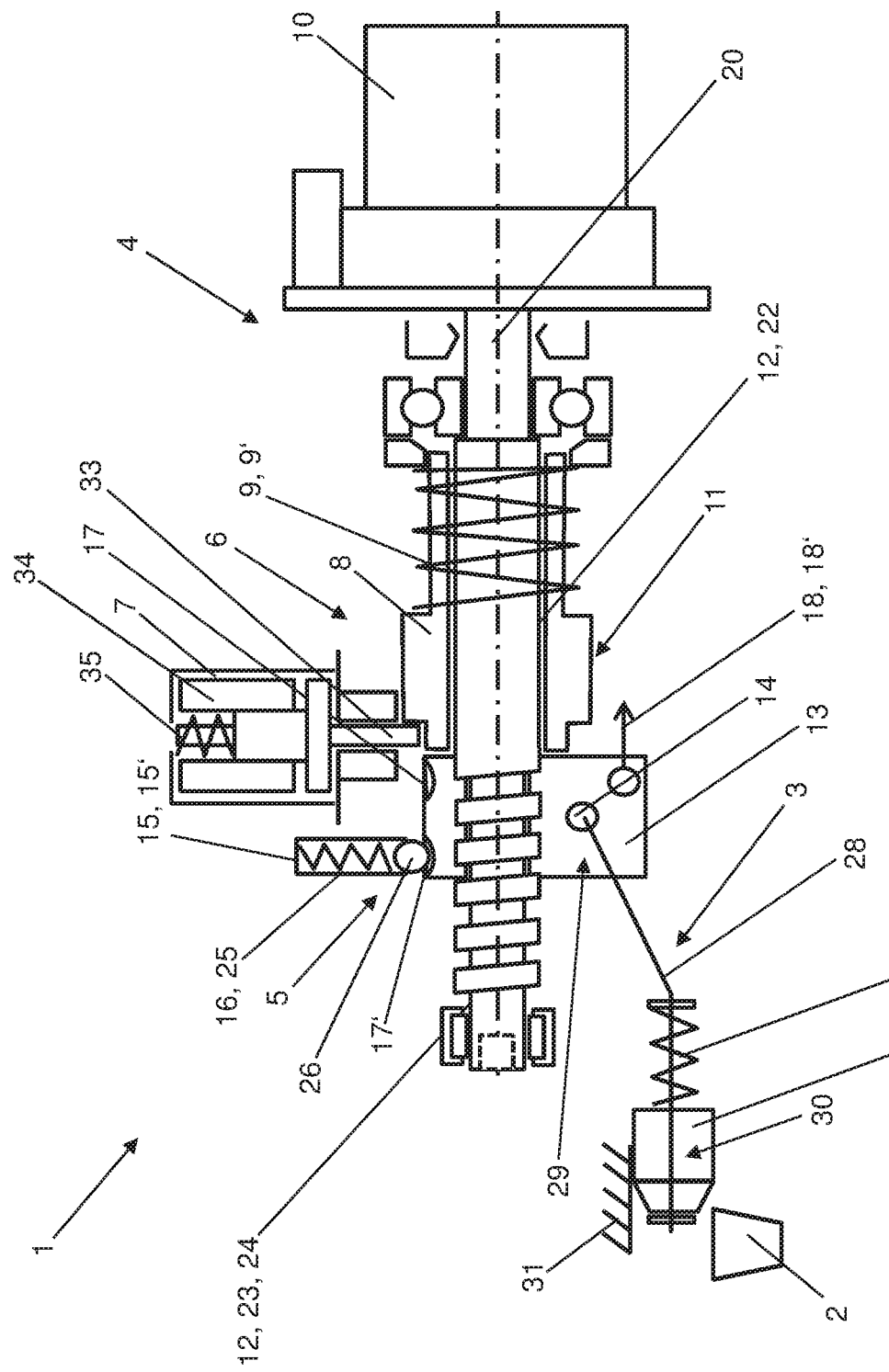
FIG. 1 shows a diagrammatic view of an exemplary first embodiment of a locking arrangement with a control element in a release position.
Figure 2:
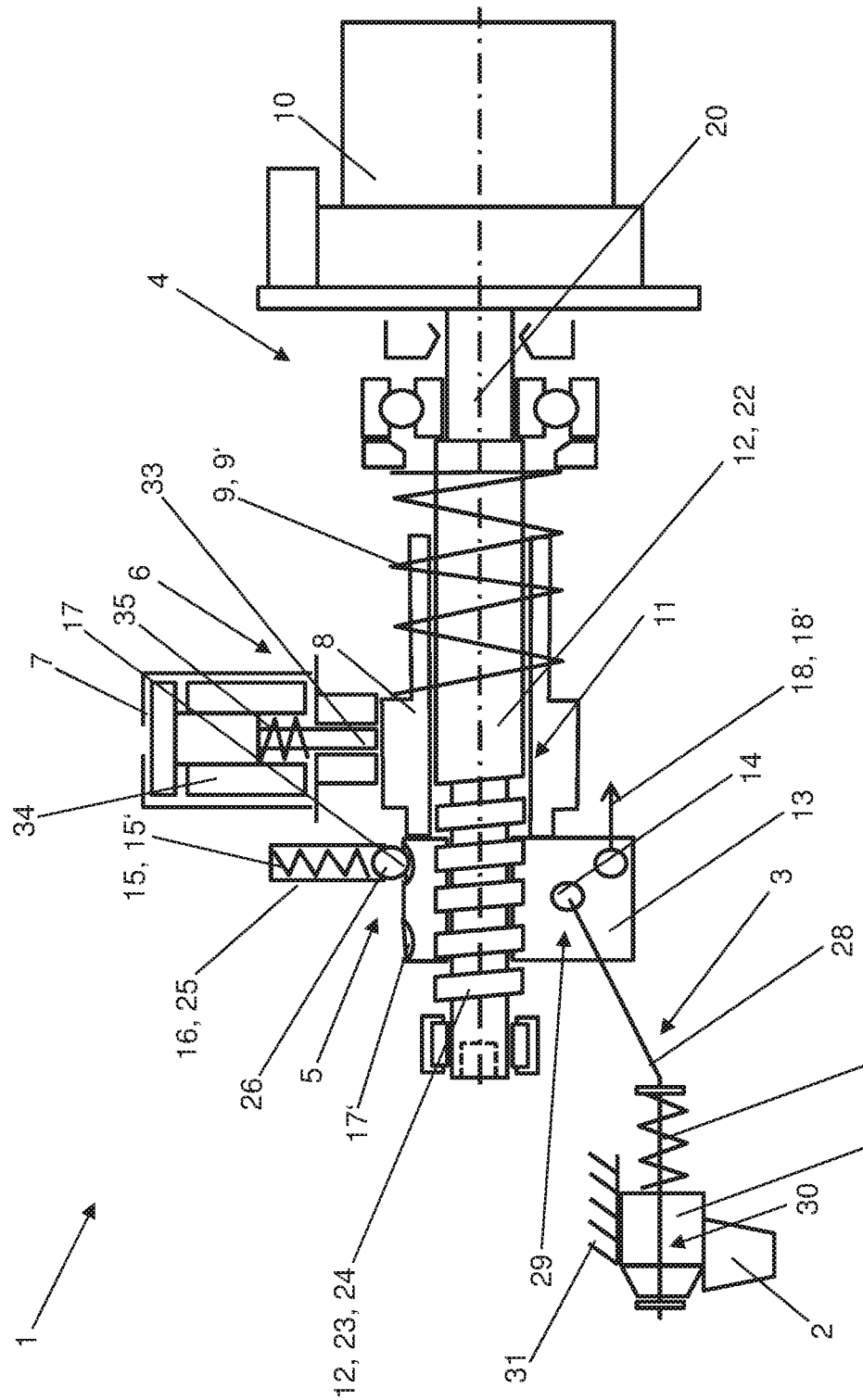
FIG. 2 shows a diagrammatic view of the exemplary first embodiment of a locking arrangement with a control element in a locking position.
Figure 5:
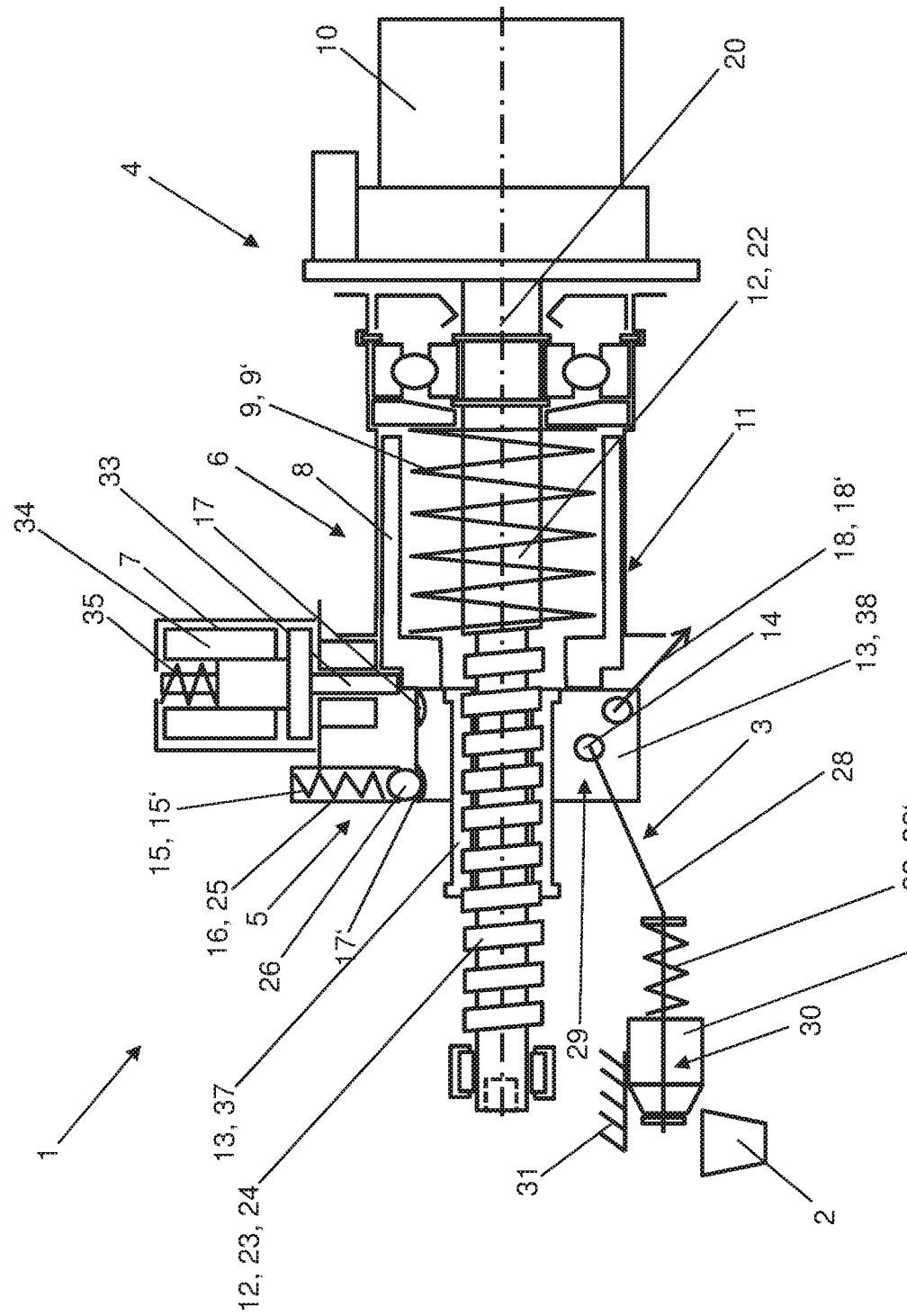
FIG. 5 shows a diagrammatic detail view of an exemplary second embodiment of a locking arrangement with a control element in a release position.

The locking arrangement 1 shown in FIGS. 1, 2 and 5 has a locking toothing (not shown), a locking pawl 2, a control element 3, a drive unit 4, a holding mechanism 5 and a safety mechanism 6. The locking pawl 2 is pivotable about a first rotary axis 21 and can be brought optionally into engagement with the locking toothing by means of the control element 3. The control element 3 can be moved via the drive unit 4 into a release position and a locking position. In the locking position of the control element 3, the locking pawl 2 is engaged with the locking toothing, causing a blocking for example of a transmission and/or drive train element (not shown) of a motor vehicle. In the release position of the control element 3, the locking pawl 2 is out of engagement with the locking toothing, whereby no blocking occurs for example of a transmission and/or drive train element (not shown) of a motor vehicle.

The drive unit 4 has an electric motor 10 and a spindle drive 11. The spindle drive 11 comprises a threaded spindle 12 and a threaded nut 13. The threaded spindle 12 has a first threaded spindle portion 22 and a second threaded spindle portion 23. The threaded nut 13 of the spindle drive 11 is arranged on the threaded spindle 12 in the region of the second threaded spindle portion 23. The threaded spindle 12 can be actuated by the electric motor 10 of the drive unit 4 into a locking rotary movement and a release rotary movement, wherein because of the thread 24, the threaded nut 13 is movable axially relative to the threaded spindle 12. Thus, by means of a threaded spindle 12, using the spindle drive 11 a rotary motion is converted into a linear motion. Such drives are known as linear actuators. The term "axial" describes a direction along or parallel to a longitudinal axis 20 of the threaded spindle 12 of the spindle drive 11.

Figure 3:
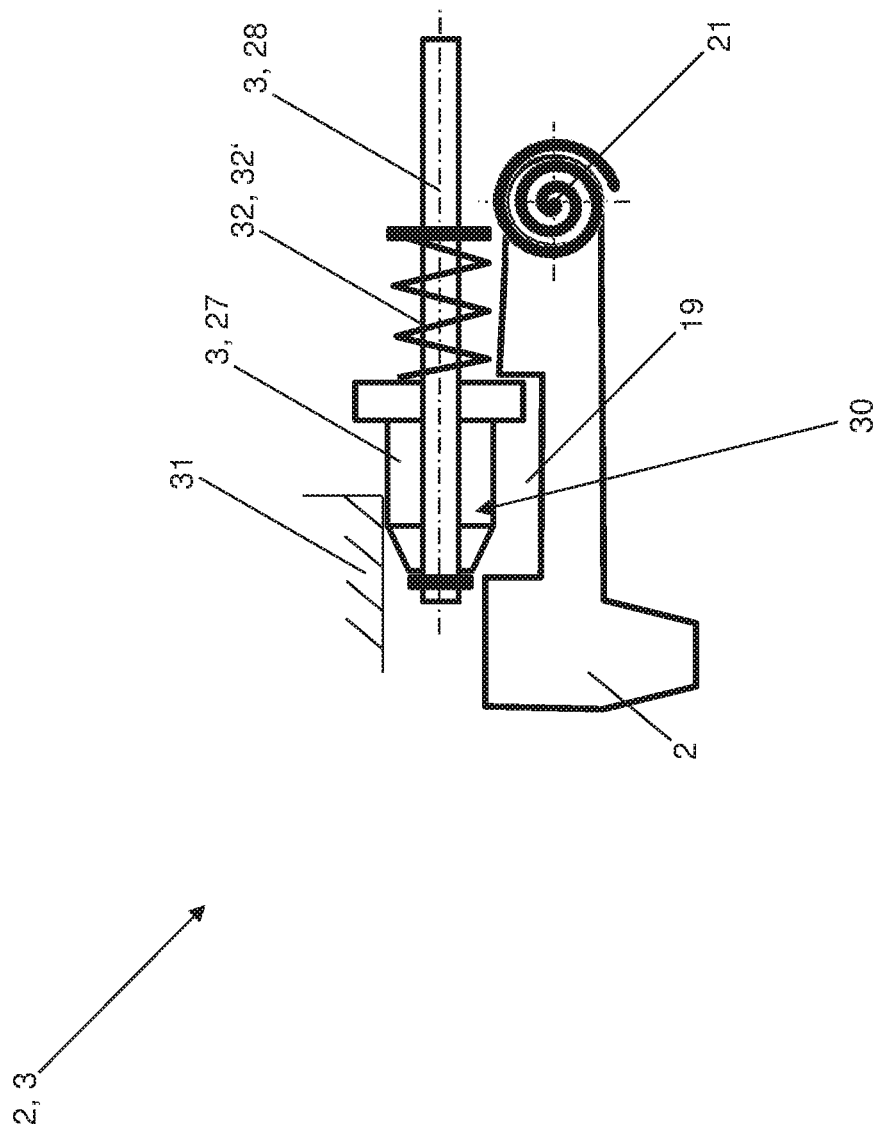
FIG. 3 shows a diagrammatic view of a control element and a locking pawl.

The control element 3 is hinged pivotably about a second rotary axis 14 on the threaded nut 13 of the spindle drive 11. The control element itself has an adjustment cone 27 and a rod linkage 28. At a first end 29, the rod linkage 28 is attached pivotably to the threaded nut 13, and at a second end 30 of the linkage, the adjustment cone 27 is arranged axially movably along the linkage 28. The adjustment cone 27 is guided axially movably in a recess 19 of the locking pawl 2. Due to the at least partial guidance of the control element 3 on the locking pawl 2, the sensitivity of the locking arrangement 1 to vibrations and/or mechanical impacts is minimised in all positions, namely in the locking position of the control element 3 and in the release position of the control element 3. The adjustment cone 27 of the control element 3 furthermore rests on a housing 31 of the locking arrangement 1, and is held in position by means of a third elastic element 32, here a third compression spring 32'; this arrangement enables the ratcheting of the locking arrangement 1 (FIG. 3).

A locking rotary movement of the threaded spindle 12 of the spindle drive 11 corresponds to a rotary movement of the threaded spindle 12 about the longitudinal axis of the threaded spindle 12 in a first rotation direction. A release rotary movement of the threaded spindle 12 of the spindle drive 11 corresponds to a rotary movement of the threaded spindle 12 about the longitudinal axis 20 of the threaded spindle 12 in a second rotation direction, namely a rotation direction opposite the first rotation direction.

The holding mechanism 5 of the locking arrangement 1 is configured such that it acts on the threaded nut 13 of the spindle drive 11 of the drive unit 4, and thus causes the control element 3 to be held in the release position and in the locking position. The holding mechanism 5 has a holding element 16 which is pretensioned in a radial direction via a second elastic element 15. The term "radial" describes a direction perpendicular to the longitudinal axis 20 of the threaded spindle 12 of the spindle drive 11.

The holding element 16 of the holding mechanism 5 is formed from a hollow cylindrical element 25 and a ball which can be received in the cavity of the cylindrical element 25, wherein the ball 26 is pretensioned radially in the direction towards the threaded nut 13 by means of a second compression spring 15' arranged in the cavity of the cylindrical element 25. Here, the ball 26 is held either by the second compression spring 15' or by the positioning of the cylindrical element 25 relative to the threaded nut 13. Furthermore, the threaded nut 13 of the spindle drive 11 comprises on its outer casing a first holding recess 17 and a second holding recess 17'.

By the engagement of the holding element 16 of the holding mechanism 5 in the first holding recess 17 on the outer casing of the threaded nut 13 of the spindle drive 11, the threaded nut 13 can be held in the second position and hence the control element 3 can be held in the release position.

By the engagement of the holding element 16 of the holding mechanism 5 in the second holding recess 17' on the outer casing of the threaded nut 13 of the spindle drive 11, the threaded nut 13 can be held in the first position and hence the control element 3 can be held in the locking position.

When the threaded nut 13 is transferred from the first position to the second position or vice versa, the ball 26 of the holding element 16 is pressed against the force of the second compression spring 15' into the cavity of the cylindrical element 25 of the holding element 16.

The safety mechanism 6 comprises an electromagnet 7, an actuator 8 and a first elastic element 9. The safety mechanism 6 serves to guarantee a reliable operation of the locking arrangement 1, for example on partial failure of the drive unit 4, i.e. failure of the electric motor 10 of the drive unit 4. The electromagnet 7 of the safety mechanism 6 comprises a ram 33, a coil 34 and a spring 35, wherein the spring 35 is configured as a compression spring and—depending on the desired function of the electromagnet 7—is arranged such that the spring force of the spring acts downward, as for example in FIG. 1, or upward, as for example in FIG. 2. The function of the electromagnet 7 may be configured as required. The ram 33 extends linearly in a direction towards the longitudinal axis 20 of the threaded spindle 12, and retracts linearly in a direction away from the longitudinal axis 20 of the threaded spindle 12.

The actuator 8 of the safety mechanism is arranged axially movably on the threaded spindle 12 in the region of the first threaded spindle portion 22, between the threaded nut 13 and the electric motor 10. An arrangement of the safety mechanism 6 parallel to the threaded spindle 12, i.e. offset thereto, is also conceivable.

The actuator 8 of the safety mechanism 6 is pretensioned in a first actuator position by the first elastic element 9. The first elastic element 9 is configured as a first compression spring 9' and presses the actuator 8 in the axial direction towards the threaded nut 13, whereby the threaded nut 13 of the spindle drive 11 in turn can be moved into the first position by the actuator 8 and be held there by means of the holding mechanism 5; as a result, the control element 3 moves into the locking position because of the pivotable connection between the threaded nut 13 and the control element 3.

Figure 4:
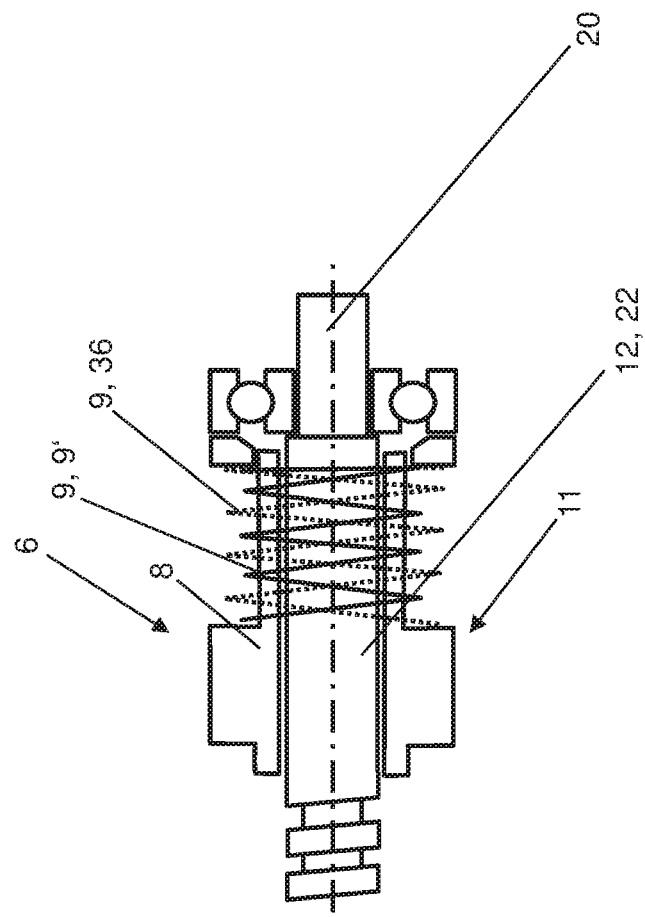
FIG. 4 shows a diagrammatic detail view of an exemplary safety mechanism.
Figure 4:
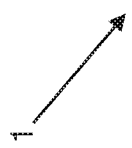

It is also conceivable—as shown in FIG. 4—to provide as a first elastic element 9 two compression springs arranged parallel inside each other; in FIG. 4, these are the first compression spring 9' and a fourth compression spring 36. In this way, the installation space required for the locking arrangement 1 in the direction of the longitudinal axis 20 can be reduced.

FIGS. 1 and 2 show a first embodiment of the locking arrangement 1.

The spindle drive 11 of the drive unit 4, or more precisely, the second threaded spindle portion 23, is configured not self-inhibiting in the first embodiment shown in FIGS. 1 and 2. The threaded nut 13 of the spindle drive 11 is configured integrally. As a result of a locking rotary movement of the threaded spindle 12, the threaded nut 13 moves relative to the threaded spindle into a first position (to the left in relation to FIGS. 1 and 2), and the control element 3 which is pivotably connected to the threaded nut 13 is transferred into the locking position. As a result of a release rotary movement of the threaded spindle 12, the threaded nut 13 moves relative to the threaded spindle into a second position (to the right in relation to FIGS. 1 and 2), and the control element 3 which is pivotably connected to the threaded nut 13 is transferred into the release position.

In FIG. 1, the actuator 8 of the safety mechanism 6 is held in a second actuator position against the force of the first compression spring 9' by means of the electromagnet 7; the threaded nut 13 of the spindle drive 11 is held in the second position via the holding mechanism 5, and the actuator 8 is in the second actuator position, wherein the actuator 8 is held in the second actuator position against the force of the first compression spring 9' by means of the electromagnet 7. In the depiction in FIG. 1, the control element 3 is therefore in the release position. By actuating the electromagnet 7, in the present case by actuating the ram 33 of the electromagnet 7, the actuator 8 can be transferred from the second actuator position shown in FIG. 1 into the first actuator position by the force of the first compression spring 9', and hence the control element 3 can be transferred into the locking position.

In the locking arrangement 1 shown diagrammatically in FIG. 1, the electromagnet 7 is for example normally extended, i.e. the safety mechanism 6 is activated by powering the electromagnet 7. By powering the electromagnet 7, or more precisely, the coil 34 of the electromagnet, the ram 33 of the electromagnet 7 is retracted against the force of the spring 35 configured as a compression spring. By the force of the first compression spring 9', the actuator 8 is transferred into the first actuator position, whereby again the threaded nut 13 is moved in a locking rotary movement and the control element 3 is moved into the locking position.

In the locking arrangement 1 shown diagrammatically in FIG. 2, the electromagnet 7 is for example normally retracted, i.e. the safety mechanism 6 is always activated on a power failure, namely an interruption in the power supply to the electromagnet 7. By powering the electromagnet 7, or more precisely the coil 34 of the electromagnet, the ram 33 of the electromagnet 7 is extended against the force of the spring 35 configured as a compression spring. In this case, on a partial malfunction of the drive unit 4, the control element 3 is in the locking position.

If the actuator 8 is in the first actuator position and hence the control element 3 is in the locking position, the actuator 8 of the safety mechanism 6 can be transferred into the second actuator position, in which the control element 3 is in the release position, only by the movement of the threaded nut 13 from the first position into the second position. A movement of the threaded nut 13 from the first position into the second position takes place when the threaded spindle 12 is actuated in a release rotary movement either by the electric motor 10 of the drive unit 4 or manually by means of a mechanical device 18.

The control element 3, in addition to the drive unit 4, can be moved manually from the locking position into the release position by means of the mechanical device 18, e.g. a Bowden cable 18', as indicated diagrammatically in FIGS. 1 and 2.

The mechanical device 18 here acts on the threaded nut 13 of the spindle drive 11 and moves the threaded nut into the second position, whereby the control element 3 is transferred into the release position because of the pivotable connection between the threaded nut 13 and the control element 3.

FIG. 5 shows a second embodiment of the locking arrangement 1. The spindle drive 11 of the drive unit 4, or more precisely, the second threaded spindle portion 23, is configured self-inhibiting in the second embodiment shown in FIG. 5. The threaded nut 13 of the spindle drive 11 is formed in two pieces and comprises a first threaded nut element 37 and a second threaded nut element 38. The first threaded nut element 37 is connected actively for drive purposes to the threaded spindle 12 via a thread. The second threaded nut element 38 is arranged rotationally fixedly but axially displaceably on the first threaded nut element 27. The control element 3 is hinged pivotably about a second rotary axis 14 on the second threaded nut element 38 of the threaded nut 13 of the spindle drive 11.

As a result of a locking rotary movement of the threaded spindle 12, the first threaded nut element 37 of the threaded nut 13 moves into a first position (to the left in relation to FIG. 5) relative to the threaded spindle 12; the first threaded nut element 37 here carries with it the second threaded nut element 38, and the control element 3 which is pivotably connected to the second threaded nut element 38 of the threaded nut 13 is transferred into the locking position.

As a result of a release rotary movement of the threaded spindle 12, the first threaded nut element 37 of the threaded nut 13 moves into a second position (to the right in relation to FIG. 5) relative to the threaded spindle 12; the control element 3 which is pivotably connected to the second threaded nut element of the threaded nut 13 is transferred into the release position.

In FIG. 5, the actuator 8 of the safety mechanism 6 is held in a second actuator position against the force of the first compression spring 9' by means of the electromagnet 7; the threaded nut 13 of the spindle drive 11 is held in the second position via the holding mechanism 5, and the actuator 8 is in the second actuator position, wherein the actuator 8 is held in the second actuator position against the force of the first compression spring 9' by means of the electromagnet 7. In the depiction in FIG. 5, the control element 3 is therefore in the release position. By actuating the electromagnet 7, in the present case by actuating the ram 33 of the electromagnet 7, the actuator 8 can be transferred from the second actuator position shown in FIG. 5 into the first actuator position by the force of the first compression spring 9', and hence the control element 3 can be transferred to the locking position.

In the locking arrangement 1 shown diagrammatically in FIG. 5, the electromagnet 7 is for example normally extended, i.e. the safety mechanism 6 is activated by powering the electromagnet 7. By powering the electromagnet 7, or more precisely, the coil 34 of the electromagnet, the ram 33 of the electromagnet 7 is retracted against the force of the spring 35 configured as a compression spring. By the force of the first compression spring 9', the actuator 8 is transferred into the first actuator position, whereby again the second threaded nut element 38 of the threaded nut 13 is moved axially on the first threaded nut element 37 of the threaded nut 13, and the control element 3 moves into the locking position.

The configuration in which the electromagnet 7 is for example normally retracted and in which consequently the safety mechanism 6 is always activated on a power failure, i.e. an interruption of the power supply to the electromagnet 7, is also conceivable in the second embodiment of the locking arrangement. Here, by powering the electromagnet 7, or more precisely, the coil 34 of the electromagnet, the ram 33 of the electromagnet 7 is extended against the force of the spring 35 configured as a compression spring. In this case, on a malfunction of the drive unit 4, the control element 3 is in the locking position.

If the actuator 8 is in the first actuator position and hence the control element 3 is in the locking position, the actuator 8 of the safety mechanism 6 can be transferred into the second actuator position, in which the control element 3 is in the release position, only by the movement of the threaded nut 13 from the first position into the second position, or more precisely the movement of the second threaded nut element 38 from the first position into the second position. A movement of the second threaded nut element 38 of the threaded nut 13 from the first position into the second position takes place when the threaded spindle 12 is actuated in a release rotary movement either by the electric motor of the drive unit 4 or manually by means of a mechanical device 18.

The control element 3, in addition to the drive unit 4, can be moved manually from the locking position into the release position by means of the mechanical device 18, e.g. a Bowden cable 18', as indicated diagrammatically in FIGS. 1 and 2.

The mechanical device 18 here acts on the second threaded nut element 38 of the threaded nut 13 of the spindle drive 11 and moves the second threaded nut element 38 of the threaded nut 13 into the second position, whereby the control element 3 is transferred into the release position because of the pivotable connection between the second threaded nut element of the threaded nut 13 and the control element 3.

Due to the two-part design of the threaded nut 13, the safety mechanism 6 is decoupled from the main actuation path of the locking arrangement 1, and it is possible to transfer the control element 3 into a locking position even on a complete blockade of the threaded spindle 12 of the spindle drive 11.

LIST OF REFERENCE SIGNS

1 Locking arrangement
2 Locking pawl
3 Control element
4 Drive unit
5 Holding mechanism
6 Safety mechanism
7 Electromagnet 8 Actuator
9 First elastic element
9' First compression spring
10 Electric motor
11 Spindle drive
12 Threaded spindle
13 Threaded nut
14 Second rotary axis
15 Second elastic element
15' Second compression spring
16 Holding element
17 First holding recess
17' Second holding recess
18 Mechanical device
18' Bowden cable
19 Recess
20 Longitudinal axis (of threaded spindle)
21 First rotary axis
22 First threaded spindle portion
23 Second threaded spindle portion
24 Thread
25 Cylindrical element
26 Ball
27 Adjustment cone
28 Rod linkage
29 First end (of linkage)
30 Second end (of linkage)
31 Housing (of locking arrangement)
32 Third elastic element
32' Third compression spring
33 Ram
34 Coil
35 Spring
36 Fourth compression spring
37 First threaded nut element
38 Second threaded nut element

The invention claimed is:

1. A locking arrangement for a transmission of a motor vehicle, comprising:
a locking toothing;
a locking pawl, wherein the locking pawl is pivotable about a first rotary axis;
a control element, wherein the locking pawl can be brought into and out of engagement with the locking toothing via the control element;
a drive unit, wherein the control element can be brought by means of the drive unit into a release position and a locking position;
a holding mechanism wherein the control element can be held by means of the holding mechanism in the release position and in the locking position;
a safety mechanism comprising an electromagnet, an actuator and a first elastic element, wherein the actuator is pretensioned in a first actuator position by the first elastic element and can be held in a second actuator position by the electromagnet;
wherein the drive unit comprises an electric motor and a spindle drive;
wherein the spindle drive comprises a threaded spindle and a threaded nut, wherein the threaded spindle can be actuated by the electric motor into a locking rotary movement and a release rotary movement, and wherein the threaded nut is axially movable relative to the threaded spindle;
wherein the control element is hinged on the threaded nut so as to be pivotable about a second rotary axis;
wherein the holding mechanism is configured such that it acts on the spindle drive of the drive unit to hold the control element in the release position and in the locking position;
wherein the holding mechanism is configured such that it acts on the threaded nut of the spindle drive; and
wherein the holding mechanism comprises a holding element pretensioned in a radial direction by a second elastic element, and the threaded nut of the spindle drive has on its outer casing two peripheral holding recesses, namely a first holding recess and a second holding recess, and wherein the control element can be held in the release position by engagement of the holding element in the first holding recess of the threaded nut, and can be held in the locking position by engagement of the holding element in the second holding recess of the threaded nut.

2. The locking arrangement according to claim 1 wherein the actuator of the safety mechanism is arranged axially movably on the threaded spindle of the spindle drive, substantially between the electric motor and the threaded nut.

3. The locking arrangement according to claim 1, wherein the threaded nut is formed in at least two pieces, namely comprising a first threaded nut element and a second threaded nut element.

4. The locking arrangement according to claim 1, wherein the control element, in addition to the drive unit, can be moved manually into the release position via a mechanical device.

5. The locking arrangement according to claim 1, wherein the control element of the locking arrangement is guided at least partially in a recess of the locking pawl.

6. A locking arrangement for a transmission of a motor vehicle, comprising:
a locking toothing;
a locking pawl pivotable about a first rotary axis;
a control element, wherein the locking pawl can be brought into and out of engagement with the locking toothing via the control element;
a drive unit, wherein the control element can be brought by means of the drive unit into a release position and a locking position, wherein the drive unit comprises an electric motor and a spindle drive having threaded spindle and a threaded nut, wherein the threaded spindle can be actuated by the electric motor into a locking rotary movement and a release rotary movement, and wherein the threaded nut is axially movable relative to the threaded spindle;
a holding mechanism, wherein the control element can be held by means of the holding mechanism in the release position and in the locking position; and
a safety mechanism comprising an electromagnet, an actuator and a first elastic element, wherein the actuator is pretensioned in a first actuator position by the first elastic element and can be held in a second actuator position by the electromagnet, wherein the actuator of the safety mechanism is arranged axially movably on the threaded spindle of the spindle drive, substantially between the electric motor and the threaded nut.

7. The locking arrangement according to claim 6, wherein the control element is hinged on the threaded nut so as to be pivotable about a second rotary axis.

8. The locking arrangement according to claim 7, wherein the holding mechanism is configured such that it acts on the spindle drive of the drive unit to hold the control element in the release position and in the locking position.

9. The locking arrangement according to claim 8, wherein the holding mechanism is configured such that it acts on the threaded nut of the spindle drive.

10. The locking arrangement according to claim 9, wherein the holding mechanism comprises a holding element pretensioned in a radial direction by a second elastic element, and the threaded nut of the spindle drive has on its outer casing two peripheral holding recesses, namely a first holding recess and a second holding recess, and wherein the control element can be held in the release position by engagement of the holding element in the first holding recess of the threaded nut, and can be held in the locking position by engagement of the holding element in the second holding recess of the threaded nut.

11. The locking arrangement according to claim 6, wherein the threaded nut is formed in at least two pieces, namely comprising a first threaded nut element and a second threaded nut element.

12. The locking arrangement according to any claim 6, wherein the control element, in addition to the drive unit, can be moved manually into the release position via a mechanical device.

13. The locking arrangement according to claim 6, wherein the control element of the locking arrangement is guided at least partially in a recess of the locking pawl.

* * * * *